Figure 1:
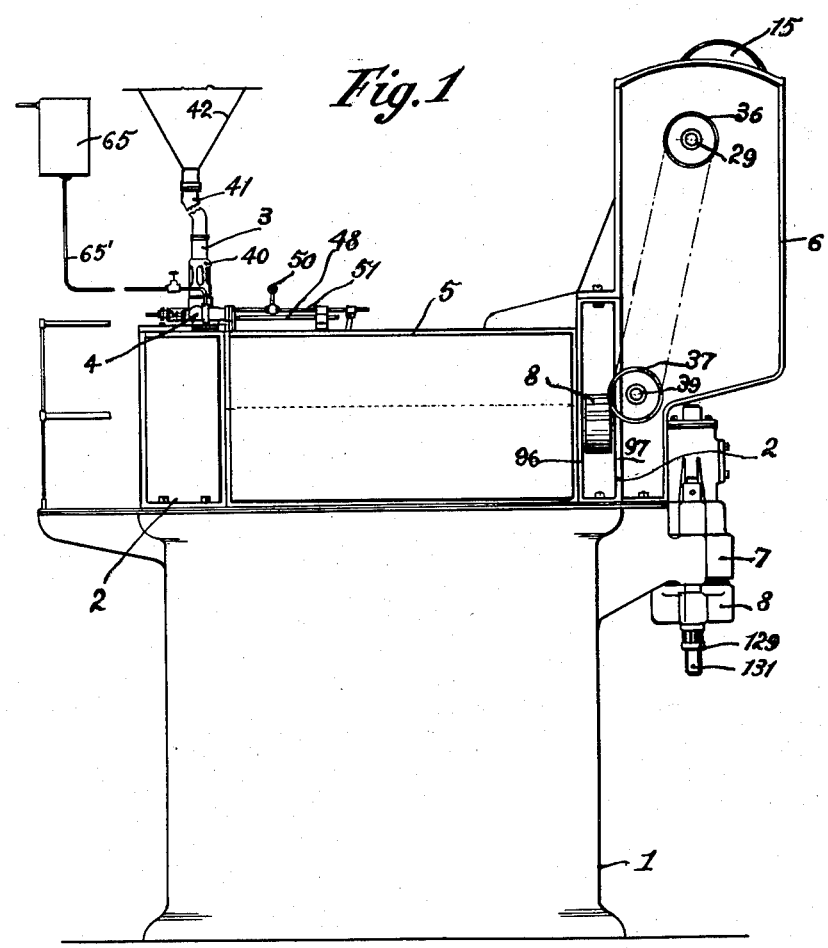

Jan. 7, 1936.　　M. BRAIBANTI ET AL　　2,026,667
MACHINE FOR PREPARING PASTES
Filed Jan. 10, 1934　　7 Sheets-Sheet 4

Inventors
MARIO BRAIBANTI
GIUSEPPE BRAIBANTI
BY Haseltine, Lake & Co.
Attorneys

Jan. 7, 1936.  M. BRAIBANTI ET AL  2,026,667
MACHINE FOR PREPARING PASTES
Filed Jan. 10, 1934   7 Sheets-Sheet 5
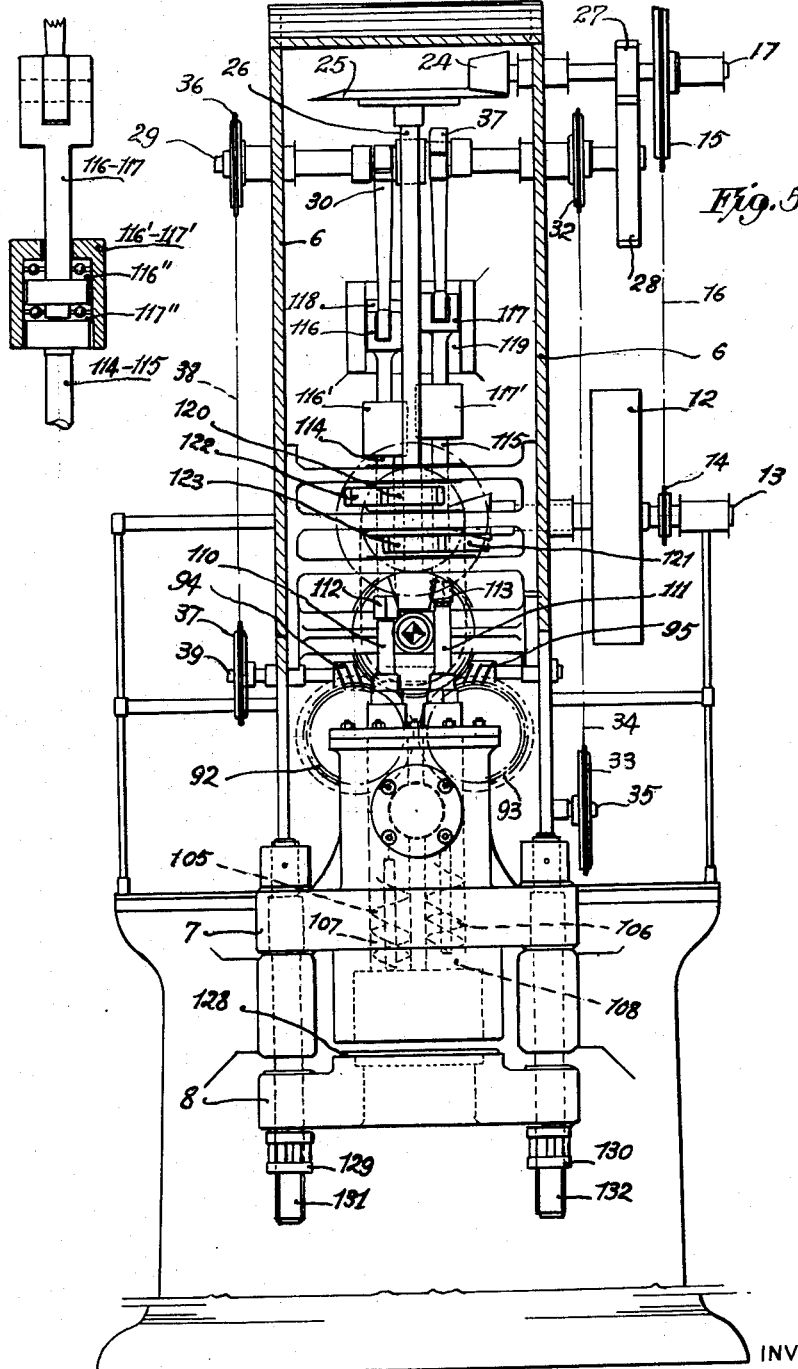
INVENTORS
MARIO BRAIBANTI and
GIUSEPPE BRAIBANTI
BY Haseltine, Lake & Co.
ATTORNEYS Jan. 7, 1936.  M. BRAIBANTI ET AL  2,026,667
MACHINE FOR PREPARING PASTES
Filed Jan. 10, 1934  7 Sheets-Sheet 6
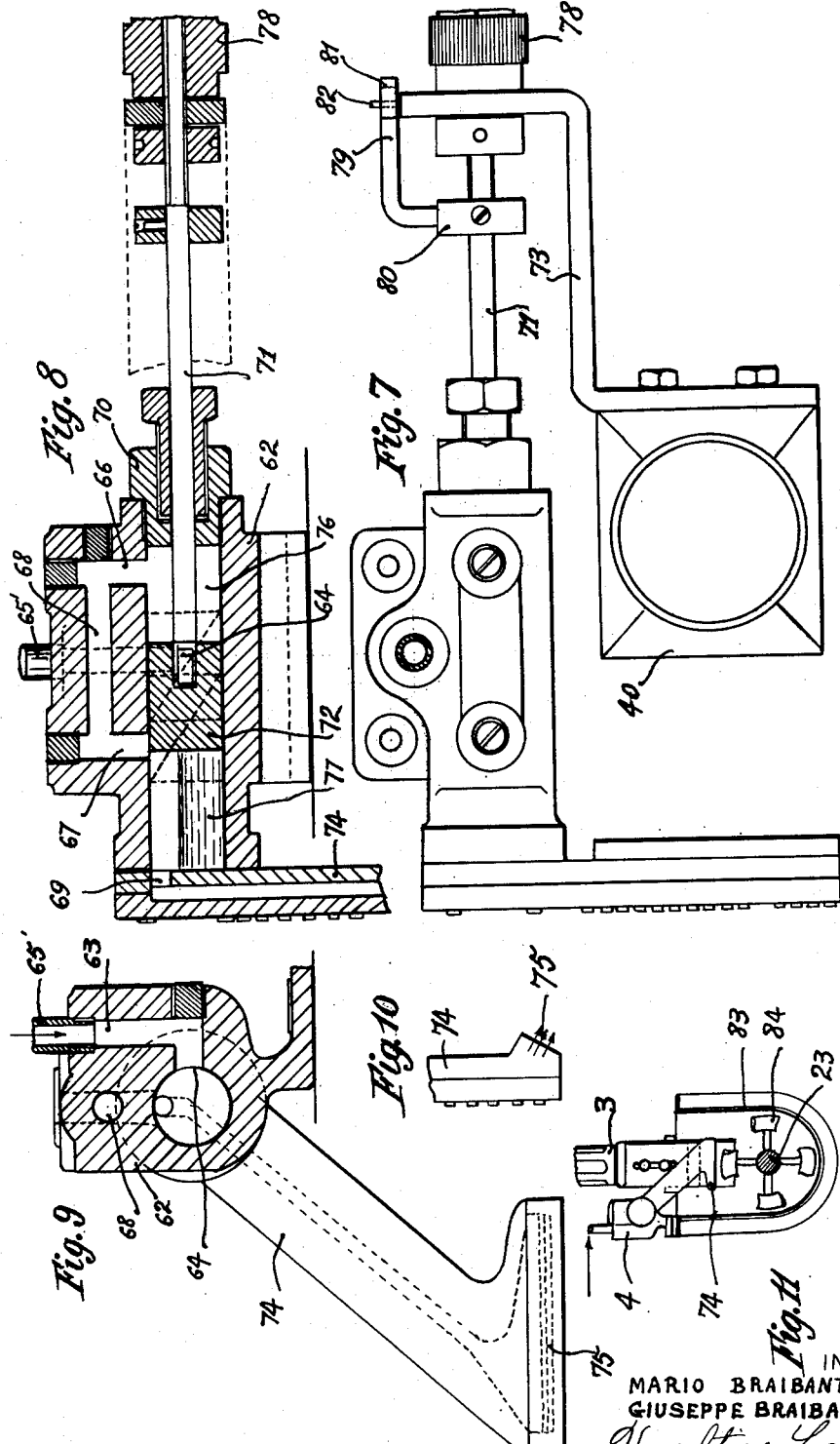
INVENTORS
MARIO BRAIBANTI and
GIUSEPPE BRAIBANTI
BY Haseltine, Lake & Co.
ATTORNEYS Jan. 7, 1936.　　　M. BRAIBANTI ET AL　　　2,026,667
MACHINE FOR PREPARING PASTES
Filed Jan. 10, 1934　　7 Sheets-Sheet 7
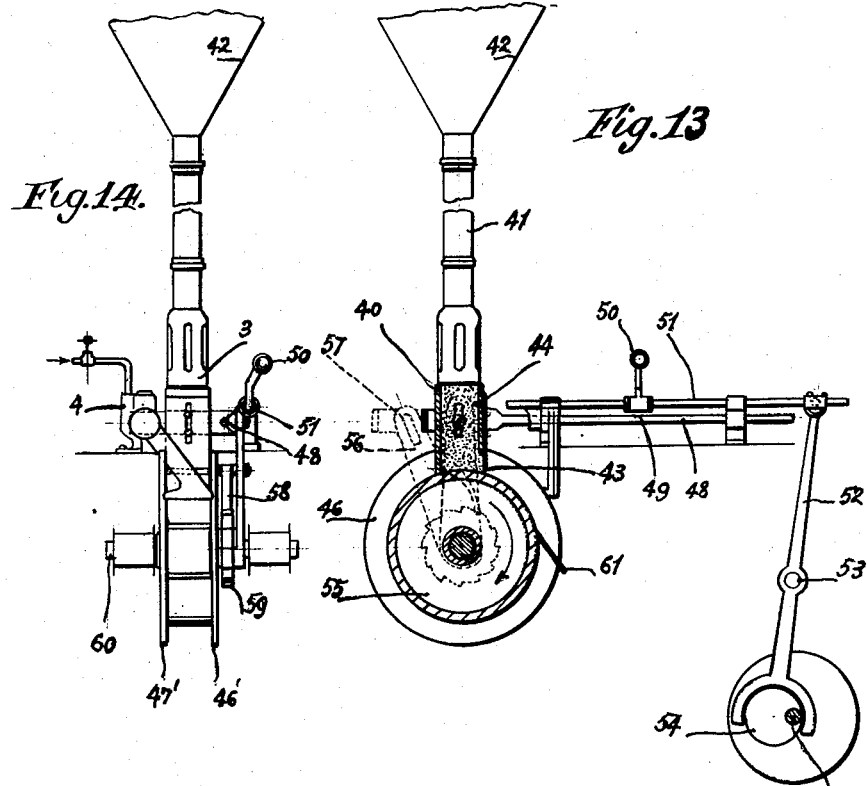
INVENTORS
MARIO BRAIBANTI and
GIUSEPPE BRAIBANTI
BY Haseltine, Lake & Co.
ATTORNEYS Patented Jan. 7, 1936

2,026,667

UNITED STATES PATENT OFFICE 2,026,667

MACHINE FOR PREPARING PASTES

Mario Braibanti and Giuseppe Braibanti,
Milan, Italy

Application January 10, 1934, Serial No. 706,077
In Italy January 18, 1933

6 Claims. (Cl. 107—14)

This invention relates to machines for preparing alimentary pastes, and particularly to the type wherein the paste is automatically and continuously pressed and drawn or extruded.

The main object of our invention is to provide a machine of the character indicated which will continuously and automatically press and also draw alimentary pastes in practically a combined operation in order to eliminate handwork and irregularity and also to greatly increase production.

The preparation of pastes intended for consumption has been carried out up to the present in three separate intermittently-working machines, namely by means of a mixing and kneading machine, a machine working with toothed bevelled rollers and a screw or hydraulic press for extruding the paste. When using these machines, the material must be transferred by hand from the kneading machine into the bevelled roller machine and from this into the press. The prepartion of the pastes thus involves inconvenient manual operations, quite apart from the fact that the material suffers owing to the action of the air on the paste during the transfer from one machine to the other and the intervening stoppages. In other words, the pressing and drawing of the pastes is thus obtained in a discontinuous manner by means of the screw or hydraulic presses comprising a piston and a cylinder carrying at one end the draw plate, the paste mass being charged in said cylinder by hand and irregularly for subsequent pressing by the piston during the down stroke of the same.

Moreover, there is the disadvantage with the known machines that, owing to the action of the teeth of the bevelled rollers on the paste delivered to these rollers by means of a rotating pulley, the kneading of the paste is unequally effected, and also that the compression or concentration of the paste resulting from a piston moving in a cylinder takes place intermittently. Independent experiments have been made to overcome the said difficulties by making an automatically-working machine, but without leading to practical result, so that up to the present a machine of this kind is not to be found on the market. On the other hand, there has been no want of experiments for the purpose of producing continually-running presses, i. e., machines for drawing out the paste in a continuous operation. The inconvenience particularly encountered was that the drawing velocity was discontinuous, whereas for the paste a constant drawing velocity and consequently a constant pressure on the draw plate is necessary, in order to avoid the defect that the drawn and cut pastes will have different thickness and length, according to the drawing pressure. Further, the paste was subjected to both an excessive heating and enervating, which caused such a deterioration of the same, that the produced pastes were rough, of small resistance, easy to ferment, uninviting and unsavory.

These experiments have been carried out on the basis of three different systems. The first system employs rotating compression expedients but could not be adapted for practical purposes, principally on account of the difficulty of obtaining perfect water tightness in the press chamber when drawing out the paste. The second system, namely the pump and piston system, employing valves, did not fulfill the expectations anticipated of it, because of failure to contrive valves of sufficient water tightness for the purpose in view and to protect the paste from excessive heating and stress. It has thus been found by actual test that in general valves can give satisfactory results for liquids, but they are unsuited to well serve for the paste, because in view of the resistance presented by the paste to the closing of the valves, an oft-repeated return of the paste through small openings still remaining takes place, with the consequence that the paste is heated and partly spoiled, whilst on the other hand the paste return entails the inconvenience, that the pressure on the draw plate is not constant. Only the third system which employs one or several axially immovable screws or worms, has found a modest entry into the market, but has in the meanwhile not been maintained by the manufacturers because the considerable frictional resistances between the screws and the paste causes the latter to become overheated and, therefore quickly wears out the screw, and in addition, causes the paste to become so overheated as to greatly deteriorate in quality. The fact is that, with machines of this kind, the paste is merely pressed forward by means of the friction converted into compressive force between it and the screws or worms and is forced through the drawing nozzles, and as this takes place under high pressure (which is necessary to overcome the resistance in the drawing nozzles), the frictional resistances and consequently the heating become very high.

By the machine embodying the present invention, the problem has been resolved of obtaining the compression and extrusion of the paste without valves, so as to avoid wearing it, while using but little power, said result having been made possible by employing screws or worms which reciprocate axially and also have a rotary movement. More precisely, said rotary movement may be either continuous or intermittent, the screws in this latter case only rotating during their backward stroke.

When the rotary movement is continuous, the paste is pressed forward and drawn out through both the forward thrust of the worms and the rotary movement of the same, and when the rotary movement is intermittent, the paste is only thus advanced during the forward thrust of the screws or worms. But in both cases the worms screw themselves out of the paste during their backward thrust, due to the rotary movement which they then effect, so that at the termination of the backward stroke of the worms, the paste is in front of the head or front end of the worms, which then, at the succeeding forward thrust, force it as by pistons into the press chamber. The heating caused by frictional resistances is thereby greatly reduced, the temperature not exceeding 40° C.

Consequently, the machine according to the invention presents all the advantages of the piston machine and of the system operating with axially immovable worms, but obviates the defects associated with these older arrangements, as the valves of the piston system and the overheating caused by means of the system with stationary worms are eliminated in this case. On the other hand, as the reciprocating movement of each worm is displaced in phase with respect to the movement of the others, a constant pressure within the press chamber and consequently a regular and constant drawing velocity is obtained.

The accompanying drawings illustrate by way of example, a form of construction of apparatus made according to the invention.

Figure 2:
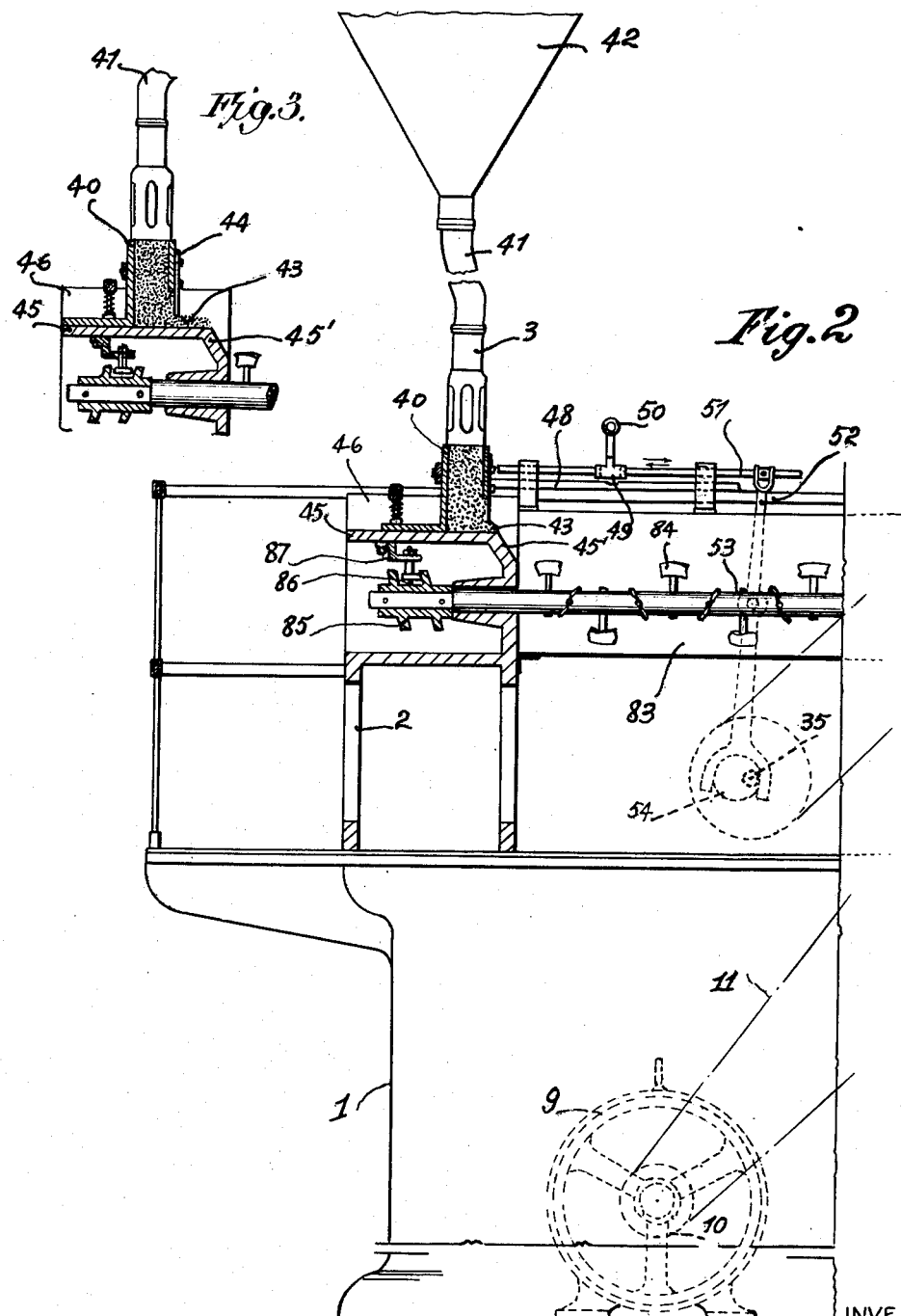
Figure 3:
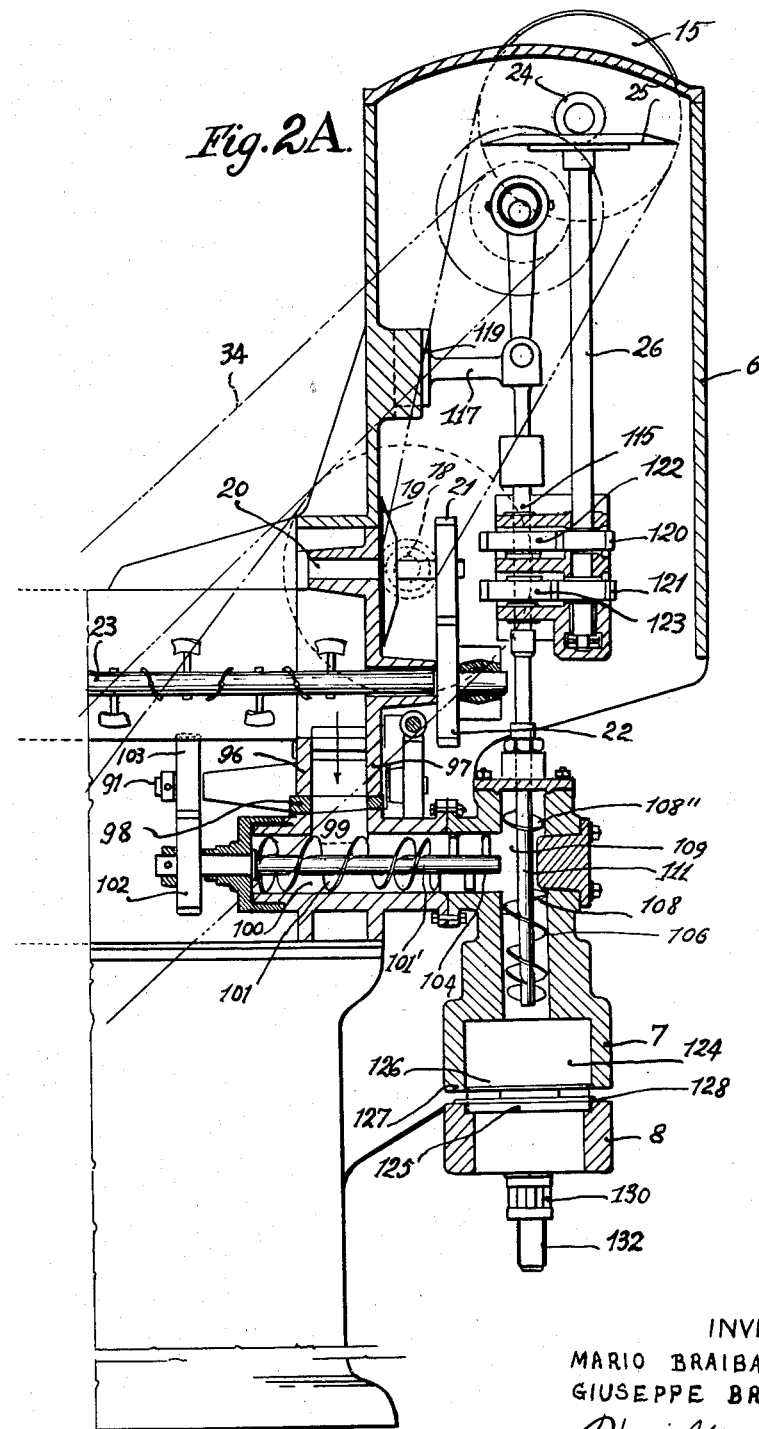
Figure 4:
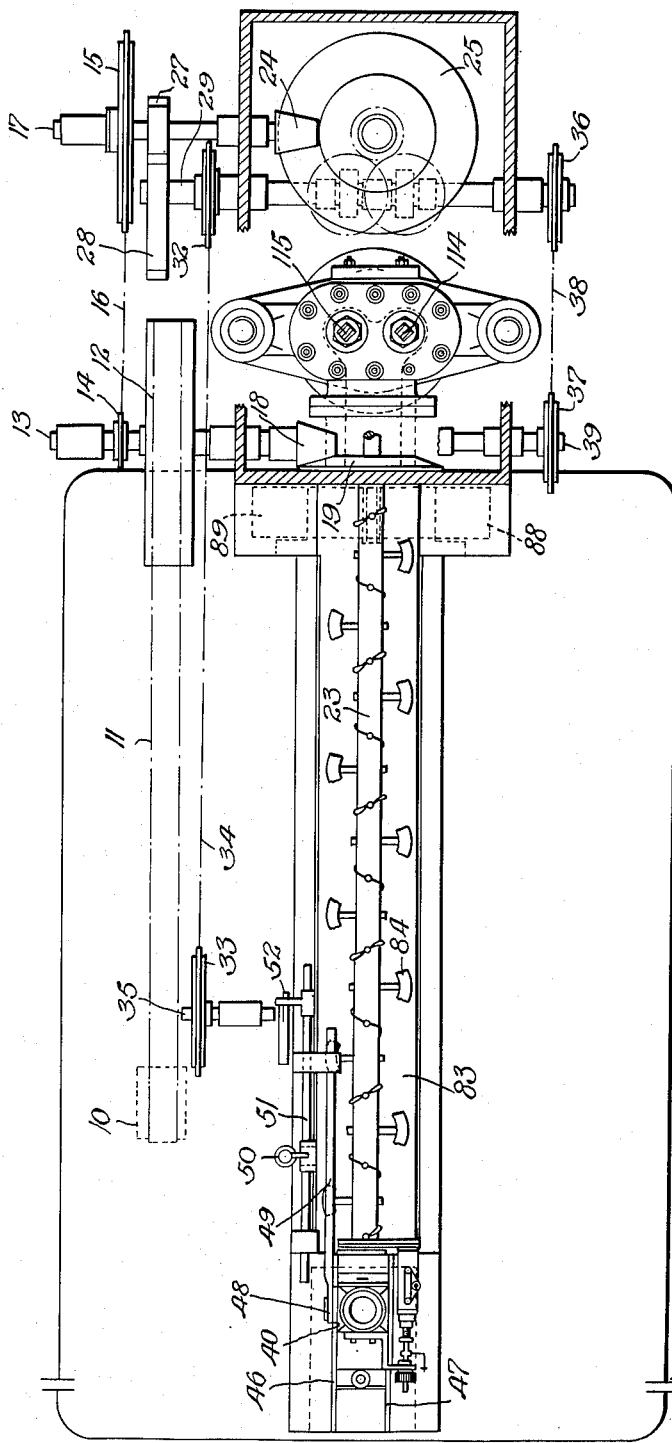

Figure 1 is a general view of the machine in practical form,

Figures 2, 2A together form a vertical longitudinal section through the machine, Figure 3 shows the details of the container-like slide or coupling box associated with the worm or screw shafts of the machine, Figure 4 shows the machine in plan view, partly in section, Figure 5 is an end view, partly in section, Figure 6 shows the details of coupling-box introduced in the worm shafts, Figures 7, 8 and 9 show the details of the water dispensing device in plan, longitudinal section and cross section respectively, Figure 10 is a side view of the spraying plate of the water atomizer shown in Figure 9, Figure 11 shows the association between the working devices of the water and the meal dispensing devices, Figures 12, 13, and 14 show in plan, vertical longitudinal section and end view another form of construction of the meal dispensing device, Figure 15 is a section through the kneading trough and the associated roller cylinders, Figures 16, 17 and 18 show in plan view, longitudinal section and cross section the design of the scraper arranged on the roller cylinders.

Throughout the views, the same reference numerals refer to the same or like parts. The machine (Figure 1) consists of a base 1 and a frame 2 mounted thereon, on which are fitted all working and driving devices for the measuring-out or dispensing and working-up of the paste, namely the device 3 for measuring-out the meal and the device 4 for measuring-out or dispensing the water, further of a housing 5 containing the kneading device, a frame 6 which carries the main driving shafts and the mechanisms for the rotation and the reciprocating movements of the pressure worms, as well as a double compression chamber 7, 8.

The machine (Figures 2 and 4) is driven by means of a motor 9, contained in the base 1, on whose shaft a pulley 10 is mounted which drives, by means of a belt 11, the pulley 12 rigidly fixed on the shaft 13. The shaft 13 rotates, by means of the chain drive 14, 16, 15 the shaft 17 and by means of the bevel wheels 18, 19 the short shaft 20, which in its turn drives the shaft 23 provided with vane or paddle arms 84 by means of the spur-wheels 21, 22. The shaft 17 transmits, by means of the bevel wheel gear 24, 25, its movement to the vertical shaft 26 and by means of the spur-wheels 27, 28 to the crank shaft 29 and the connecting-rods 30, 31 (Figure 5) engaging therewith. The shaft 35 is rotated from this crank shaft 29 by means of the chain drive 32, 34, 33 and the shaft 39 by means of the chain drive 36, 38, 37.

The device 3 for measuring-out or dispensing the meal, which is mounted on the frame 2, consists of a container-like slide-valve 40 with no bottom, which is connected with the meal delivery hopper 42 by means of a flexible pipe 41. This container 40 is provided on its front with an orifice 43 adjustable by means of a damper 44 and has, as support, a base-plate 45 rigidly associated with the frame 2, the said base-plate 45 having a chamfered front 45', on the other hand upward projecting ledges 46 at its sides (Figure 4). A rod 48 is connected to the container-like slide-valve 40. This rod 48 is provided with a notch, in which the handle 50 of the rod 51 can be engaged. The rod 51 is moved backwards and forwards by means of a lever 52 pivoted on a tappet 53, the drive of which is effected by means of an eccentric 54 mounted on the shaft 35. In this manner, when the handle 50 is swung upwards, the slide-valve 40 remains motionless, when the handle 50 is put over on the other hand it is moved to and fro.

Figures 12, 13 and 14 show another form of construction of meal measuring-out device, based on the same principle, i. e. a form of construction in which the measuring-out takes place likewise by means of relative movement of the bottomless container 40 in regard to its supporting plate. Whereas, in the arrangement already described, the slide-valve 40 is movable but the supporting plate 45 is fixed, in the form of construction according to Figures 12–14 the slide-valve 40 is fixed, the supporting plate 45 on the other hand movable. Meanwhile, this supporting plate here consists of the casing surface of a cylinder 55, which is provided with flange-like cheeks 46', 47'. When the handle 50 is put over and is engaged in the notch 49 of the rod 48, the latter is gripped by means of the rod 48 and receives a reciprocating movement which transmits itself to the arm 56 articulated with the pin 57 and through this arm 56, by means of the pawl 58, to the ratchet-wheel 59, whereby the cylinder 55 mounted rigidly on shaft 60 is moved forward step by step. The knife 61 serves to scrape the cylinder 55 and moreover plays a part similar to that of the chamfered surface 45' (Figure 2).

The device 4 for measuring-out the water (Figure 11) is mounted next to the meal measuring-out device 3. It consists (Figures 7, 8, 9) of a cylinder 62 fixed on the frame 2, to which water is delivered from a container 65 through a pipe 65', the channel 63 and the inlet orifice 64. In the upper part of this cylinder there are two orifices 66, 67, connected together by means of a channel 68. A further orifice 69 is provided above at the front end of the cylinder 62. At the other end the cylinder is tightly closed by means of a stuffing-box 70. The rod 71 of the piston 72 passes through this stuffing-box 70. The piston rod 71 is connected to the slide-valve 40 of the meal measuring-out device 3 by means of an arm 73. At the front end of the cylinder 62 a water atomizer 74, provided with a large number of nozzles 75, is attached to the water-outlet orifice 69.

The water measuring-out device works as follows:—

When the slide-valve 40 of the meal measuring-out device moves to and fro the piston 72 of the water measuring-out device moves with it. On the piston 72 then reaching the end of its forward stroke, it closes the orifice 67, whilst the water-inlet orifice 64 becomes connected with the back space 76 of the cylinder and the communication channel 68, which are both filled with water.

During the return movement of the piston, namely as soon as the inlet orifice 64 has been almost entirely closed by the piston 72, the orifice 67 is gradually opened, until finally the piston forces the water over out of the space 76 through the orifice 66 and the channel 68 into the front space 77 of the cylinder 62. As this space 77 always has a greater content than the back space 76, the water level in it always remains below the outlet orifice 69. When the piston 72 moves forward again the water, after the orifice 67 is closed, is forced out through the orifice 69 and consequently through the nozzles 75 of the atomizer 74. Hence, with each stroke of the piston an equal quantity of water is delivered. This quantity of water can, however, be varied. The useful stroke of the piston 72, i. e. that stroke in the course of which the piston forces over the water out of the back space 76 to the front space 77, corresponds to the path between the complete closing of the water-inlet orifice 64 and the position of the piston at the end of the stroke. Consequently, if the end of the return stroke of the piston be displaced towards the stuffing-box 70 whilst maintaining constant the length of overall stroke of the piston, the useful stroke is thereby increased and, as a result, the quantity of water forced over towards the front space, and vice versa. The displacement of the end of the return stroke of the piston is effected by screwing up or unscrewing the nut 78 on the screwed spindle 71. This does not cause this screwed spindle to turn, as it is prevented from doing so by means of the arm 79, which is mounted rigidly on the spindle 71 by means of a collar 80 and which has a longitudinal slot 81 in which the pin 82 of the grip 73 engages, which latter, as already stated, is connected with the slide-valve 40 of the meal measuring-out device 3.

The kneading device consists, as customary in machines of this kind, of a rectangular trough 83 with semi-cylindrical bottom and of a shaft 23 arranged therein with kneading vanes 84 of suitable shape. These kneading vanes are bent in opposite directions, so that whereas the tendency of one lot is to force one part of the paste forwards in order to mix it with that which has already been pushed forwards, those following after have the tendency partially to force back the paste in order to mix it with that which is crowding after. The vanes or paddles can, for instance, be arranged in alternate succession in accordance with two helical lines of opposite direction of running. The shaft 23 is rotated by means of the spur-wheels 21, 22, but in relation to the well known kneading machine with this difference, that it is moved to and fro at the same time in the axial direction. For this purpose a pulley 85 provided with a curved groove is mounted on the shaft 23, in the curved groove of which a roller 86 engages which is carried by a support 87 fixed to the machine frame 2. The meal measuring-out device 3 and the water measuring-out device 4 (Figure 11) are mounted at one end of the trough 83, whilst two rollers 88, 89 (Figure 15) are arranged at the other end, which are mounted on parallel shafts 90, 91, which are driven by means of two toothed wheels 92, 93 (Figure 5) on them by two worms 94, 95 rigidly keyed on the shaft 39.

Under the two rollers 88, 89 (Figures 15, 17, 18), covered at their ends by means of the side walls 96, 97 (Figure 2) a scraper 98 is fixed in the space for the passage of the paste between the rollers and through the orifice 99 of the cylindrical chamber 100 (Figure 2).

The device provided with toothed bevel-wheels consists of the said chamber 100, whose hollow cylindrical walls may be smooth, fluted or grooved, as well as a worm 101 which is rotated by means of the toothed wheels 102, 103. The toothed wheel 103 is mounted on the shaft 91 carrying the roller 89, and the front end of the shaft 101' carrying the worm 101 is provided with kneading pins or kneading paddles 104. If necessary, this worm can be actuated with alternate movement. The kneading pins 104 can be dispensed with for working up certain kinds of meal; in this case the worm 101 is replaced by means of a longer one, which then serves merely as a paste screw-conveyor.

The compressing device (Figures 2–5) consists of two helical worms 105, 106 and two hollow cylinders 107, 108 containing the same, which are closed at the top and connect with the chamber 100 through the space 109. The shafts 110, 111 of the worms 105, 106 are connected with the rods 114, 115 of square cross section by means of two coupling boxes 112, 113. The two compressing worms 105, 106 are put either in rotatory or in reciprocating axial motion. The latter motion is imparted by means of the crankshaft 29, whose cranks are set at 180° in relation to one another and whose connecting-rods are guided by means of two slides 116, 117 which slide in guides 118, 119 provided on the frame 6. The two slides 116, 117 are connected with the rods 114, 115 by means of coupling-boxes 116', 117' (Figure 6), and the connection is contrived in such a manner that these coupling-boxes can turn freely on the vertical arm of the angle-pieces forming the slides 116, 117, for which purpose ball bearings 116'', 117'' are built into the coupling-boxes (Figure 6). The rods 114, 115 and consequently the worms 105, 106 are thereby able to turn. This rotary movement is diverted by the vertical shaft 26 (Figure 2), namely by means of the interpolated spur-wheel gearings 120, 122 and 121, 123. The toothed wheels 122, 123 are loosely mounted with square bore of boss on the four-sided rods 114, 115, so that the latter can move axially to and fro.

The shafts 110, 111 of the worms 105, 106 can also be provided with kneading pins or kneading vanes 107', 108' as well as with one or two wormings 107", 108", which prevent the paste from escaping out of the top of the chamber 109.

The press or compression chamber consists of the two parts 7, 8. In the compression space 124 of the upper part 7 the two hollow cylinders 107, 108, open out, whereas the lower part 8 has a cruciform seating 125, against which the drawplate 126 is supported. Of these two parts of the chamber 7, 8 the lower one is provided with an annular ridge 128 of trapezoidal section which fits into an annular groove 127 in the upper part 7. If the parts 7 and 8 are firmly pressed together by screwing up nuts 129, 130 running on bolts 131, 132 which are secured to the upper part 7 and pass through the lower part 8, the annular ridge 128 engages in the corresponding annular groove 127, whereby the cylindrical chamber 124 is closed completely watertight.

The machine described works as follows:—

After starting up the electric motor 9, the handle 50 is engaged in the notch 49 of the rod 48. The slide-valve 40 of the meal measuring-out device 3, to which a reciprocating movement is now imparted, moves from the position according to Figure 1 into the position according to Figure 2 and a certain quantity of meal then slides over the supporting plate 45 and the chamfering 45' into the trough. At the same time the water measuring-out device 4 is moved as well, by means of the slide-valve 40 through the arm 73 and the rod 71 of the piston 72, the result of which is that during the gliding of the meal on the chamfering 45' a measured quantity of water simultaneously spurts out of the nozzles 75 and moistens the meal uniformly. The slide-valve 40, on returning into its initial position, leaves behind a quantity of meal which is always the same on the base or supporting plate 45. The quantity of meal to be apportioned can be regulated as desired by suitably adjusting the thickness of this layer of meal by means of the damper 44, and the quantity of water to be apportioned by screwing forwards or backwards the nut 78 on rod 71 of the water measuring-out device 4.

Hence, it is possible to vary the quantity of meal to be kneaded or the quantity of water to be sprayed, and thereby the degree of stiffness of the paste, by means of the meal and the water measuring-out devices.

Whilst the uniformly moistened meal glides down the chamfering 45', in order to fall into the trough 83, the kneading shaft 23 rotates and at the same time moves to and fro in the axial direction. During its axial forward thrust it pushes the mass of meal forwards, so that the quantity of meal moistened and crowding on from behind, falls into the hollow space resulting between the paste and the walls of the trough, whilst part of the paste passes on to the rollers 88, 89 and passes through them. During the backward thrust of the shaft 23, the paste cannot be forced backwards by means of the paddles 84, as of course the hollow space previously resulting is now filled up again with meal. Consequently, the paddles merely beat through the pasty mass.

Consequently the paste is forced forward step by step by means of the reciprocating motion of the shaft 23.

A paste kneaded through and through uniformly is obtained by means of the rotary motion of the paddles 84 and owing to the fact that these paddles are alternately bent in the opposite direction (whereby their tendency is to mix a part of the paste which has already been thrust forwards with that which is following), whereas the kneading process is accelerated by means of their axial forward and backward thrust and correspondingly, as a result of the diagonal action of the paddles on the entire mass of the paste, a thoroughly kneaded paste is obtained.

As already stated, the paste gradually enters between the rollers 88, 89, which serve for the uniform and continuous feed of the devices operating with toothed bevel rollers. The paste is then passed through the orifice 99 of the cylindrical chamber 100 by means of the scraper 98, where it is seized by the worm 101 and compressed at its front end. At this point the granules of meal present are titurated against one another and thus disintegrated, by means of the kneading pins or kneading vanes 104 that are rotating with the worm and at the same time beating through the paste. In other words, these pins or vanes thoroughly knead the paste. The paste, kneaded and pressed forward into the space 109 of the chamber by means of the worm 101 reaches in this manner the cylindrical chambers 107, 108, where it is seized by the compressing worms 105, 106 and under the action of the rotary motion of these worms is forced into the compression chamber 124. As already explained, the two worms 105, 106 are moved up and down and as the cranks of the crank-shaft 20 effecting this movement are set at 180° to one another, it follows from this that if the one worm goes downwards the other rises, i. e. that if the one reaches the end of its back stroke, the other reaches the end of its compression stroke.

The two compression worms 105, 106 work in the following manner:—

The worm 106 situated at the end of its upward thrust and screwed back over against the paste mass has left in front of its front end in the chamber space 108 (Figure 5) a quantity of paste corresponding to the length of its stroke. During the compression stroke, the worm 106 compresses this quantity of paste in the interior of the compression chamber 124, in which its rotary motion assists this work of compression. This kind of motion of the worm is also converted into a kind of valve action, because of course the paste cannot make a backward movement in the turns of the worm and is much rather pushed forwards by other paste crowding behind owing to the rotary movement of the worm.

In the same manner the worm 105 travels over its backward stroke during the compression stroke of the worm 106, whereby it screws itself out of the paste. The succeeding change of stroke then initiates the compression process. As the rise of the worms is constant and their reciprocating movement is displaced in phase by 180°, the compression in the interior of the compression chamber 124 is constant in intensity, and in a corresponding manner the drawing process is also enacted at uniform speed. The compressing device may also consist of only a single compression worm, in which case the paste runs through the draw plate intermittently. But several, e. g. three worms may be employed, whose drive must be effected by means of three cranks set at 120° in respect of one another.

As already mentioned, the worms 105, 106 can also be driven in such a manner that they are only rotated during their upward movement during which they screw themselves out of the paste, whereas they effect their downward stroke, i. e. the compression stroke, as a piston, without rotary movement. The paste becomes less heated with this method of operation; but a part of the paste may get dammed back along the turns of the worms 105, 106.

In order to change the shapes and drawing dies it is only necessary to unscrew the screwnuts 129, 130 and to remove the lower part 8 of the compression chamber which is pushed on to the bolts 131, 132 from these bolts.

What we claim and desire to secure by Letters Patent of the United States is:

1. A machine for preparing alimentary drawn or extruded paste from kneaded paste, having pressing and extruding means for drawing or extruding the paste, comprising a press chamber, a draw plate forming the bottom of said press chamber, feeding means for receiving kneaded paste mass and passing the same to the pressing and extruding means, a plurality of cylindrical chambers upon said press chamber communicating freely with one end of the said feeding means, screws or worms rotatably mounted in said cylindrical chambers, means for imparting a reciprocating up and down movement to said screws, and means for rotating said screws.

2. A machine for preparing alimentary drawn or extruded paste from kneaded paste, having pressing and extruding means for drawing or extruding the paste, comprising a press chamber provided with a draw plate serving as the bottom thereof, feeding means for receiving kneaded paste mass and passing the same to the pressing and extruding means, and a plurality of cylindrical chambers disposed upon said press chamber and freely communicating with one end of the said feeding means, worms or screws rotatably disposed in said cylindrical chambers, a rotatable shaft having eccentrics imparting to said screws reciprocating axial movements respectively displaced in phase, means for rotating said screws, and means for driving said shaft.

3. A machine for preparing alimentary drawn or extruded paste from kneaded paste, having pressing and extruding means for drawing or extruding the paste, comprising a press chamber provided with a draw plate serving as the bottom thereof, feeding means for receiving kneaded paste mass and passing the same to the pressing and extruding means, and a plurality of cylindrical chambers disposed upon said press chamber and freely communicating with one end of the said feeding means, worms or screws rotatably disposed in said cylindrical chambers, a rotatable shaft having eccentrics imparting to said screws reciprocating axial movements respectively displaced in phase, means for rotating said screws, both during their upward and downward reciprocating strokes, and means for driving said shaft.

4. A machine for preparing alimentary drawn or extruded paste from kneaded paste, having pressing and extruding means for drawing or extruding the paste, comprising a press chamber provided with a draw plate serving as the bottom thereof, feeding means for receiving kneaded paste mass and passing the same to the pressing and extruding means, and a plurality of cylindrical chambers disposed upon said press chamber and freely communicating with one end of the said feeding means, worms or screws rotatably disposed in said cylindrical chambers, a rotatable shaft having eccentrics imparting to said screws reciprocating axial movements respectively displaced in phase, means for rotating said screws, during their upward reciprocating strokes, means for stopping rotation of the screws during their downward reciprocating strokes, and means for driving said shaft.

5. A machine for preparing alimentary drawn or extruded paste from kneaded paste, having pressing and extruding means for drawing or extruding the paste, comprising a press chamber provided with a draw plate serving as the bottom thereof, feeding means for receiving kneaded paste mass and passing the same to the pressing and extruding means, and a plurality of cylindrical chambers disposed upon said press chamber and freely communicating with one end of the said feeding means, worms or screws rotatably disposed in said cylindrical chambers, and vanes upon said screws for disintegrating the paste.

6. A machine for preparing alimentary drawn or extruded paste from kneaded paste, having pressing and extruding means for drawing or extruding the paste, comprising an upper press portion forming a press chamber, a draw plate forming the bottom of said press chamber, feeding means for receiving kneaded paste mass and passing the same to the pressing and extruding means, a lower press portion having an upper ridge fitting into a corresponding groove in said upper press portion so as to tightly connect the lower press portion to said upper press portion, cylindrical worm housings fixed to the upper press portion while the chambers therein are disposed upon the press chamber and being open freely to one end of said feeding means, the lower press portion being mounted upon guide bolts carried by the worm housings, and rotatable screws or worms reciprocating within said worm housings.

MARIO BRAIBANTI.
GIUSEPPE BRAIBANTI.